United States Patent [19]
Dekumbis et al.

[11] Patent Number: 5,147,999
[45] Date of Patent: Sep. 15, 1992

[54] LASER WELDING DEVICE

[75] Inventors: Roger Dekumbis, Zurich; Charles Marsden; Jean-Daniel Wagniere, both of Lausanne, all of Switzerland

[73] Assignee: Sulzer Brothers Limited, Winterthur, Switzerland

[21] Appl. No.: 628,399

[22] Filed: Dec. 17, 1990

[30] Foreign Application Priority Data

Dec. 27, 1989 [CH] Switzerland .......................... 4658/89

[51] Int. Cl.$^5$ ............................................. B23K 26/00
[52] U.S. Cl. ............................ 219/121.63; 219/121.84
[58] Field of Search ...................... 219/121.63, 121.64, 219/121.84, 121.6, 121.85

[56] References Cited

U.S. PATENT DOCUMENTS 4,182,299 1/1980 Earle ..................................... 123/188
4,835,357 5/1989 Schalk ............................. 219/121.64

FOREIGN PATENT DOCUMENTS 3801068 7/1989 Fed. Rep. of Germany .

*Primary Examiner*—C. L. Albritton
*Attorney, Agent, or Firm*—Kenyon & Kenyon

[57] ABSTRACT

The laser welding device is used for welding or coating workpieces. The device includes a nozzle for feeding powder to the operating area of a workpiece for melting within a laser beam directed onto the workpiece. The axis of the laser beam and the axis for the direction of movement of the laser beam on the surface of the workpiece, as well as an axis mutually perpendicular to the two axes, define a coordinate system having an origin at the point of incidence (EL) of the laser beam on the surface of the workpiece. A controllable and adjustable device maintains the positions of the nozzle largely constant in the coordinate system even when the relative movement of the laser beam and the workpiece are complex. This enables weld joints and welded-arm layers of a complex form and a largely homogenous quality to be produced.

21 Claims, 6 Drawing Sheets

LASER WELDING DEVICE

This invention relates to a laser welding device. More particularly, this invention relates to a laser welding device for welding workpieces and at least partially coating workpieces.

As is known, the welding, i.e. joining of metallic workpieces, can be carried out by means of laser beams which are used as an energy source, for example, in MIG and TIG types of welding. In addition, welding material can be blown towards the resulting weld seam in powder form or delivered to the seam in the form of a rod.

For example, U.S. Pat. No. 4,835,357 describes a method for the thermal welding of contiguous sheet metal members which utilizes a laser beam and powdered filler material. Also, U.S. Pat. No. 4,182,299 describes a welding technique in which a powdered material is delivered onto an engine valve and subsequently melted by means of a laser beam in order to form a bonded layer on the valve. German OS 3801068 illustrates a machine in which powdered metal is blown onto a workpiece within the confines of a laser beam.

However, the known devices for welding by means of laser beams have been unable to produce weld seams of a uniform quality if the seams have complex curvatures instead of being rectilinear.

Surfaces of workpieces made of a material which are inexpensive and easy to treat are often altered or finished in order to give the workpieces the required material properties in certain areas. For example, the bearing, corrosive or abrasive properties of a part may be improved at specific points (e.g. by deposit welding). This improvement and alteration, particularly of the surface properties of workpieces, may be carried out by welding a layer of a material with the desired, improved, material properties onto the surface of the workpiece by means of a laser beam, e.g. of a $CO_2$ laser, or of a different laser with a high radiation energy. The material with the better material properties is blown in the form of powder, for example, towards the operating area of the laser beam and onto the surface of the workpiece.

Devices for coating the surfaces of workpieces by means of lasers, towards the operating area of which the coating material is blown as powder, have until now only been able to remelt a relatively small proportion of the powder into the surface layer. The workpiece surface has to be fused in order to create a firm bond between the workpiece and the surface layer. Known devices usually fuse the workpiece material to a substantial degree, so that the new surface layer, consisting of the coating material, is alloyed with the workpiece material to an excessive degree, i.e. rendered impure. This has an adverse effect on the properties of the surface layer, or may greatly limit the possible applications of the coated devices. This may be the case when applying relatively thick layers, which permit subsequent machining.

Furthermore, the known devices are practically unable to produce coatings of a uniform quality if the layers have complex contours which cannot be produced with rectilinear movements of the laser beam and/or workpiece.

Accordingly, it is an object of the invention to provide a laser device by means of which weld joints of the most varied curvatures and a largely uniform quality can be produced in a simple manner even on a workpiece with complex body contours, without this necessitating special high-power manipulators for the workpiece.

It is another object of the invention to provide a laser device for surface coating (deposit welding) which, using simple manipulators, enables complex coating patterns and layers of a largely uniform quality to be produced even on workpieces with complex surface shapes.

It is another object of the invention to provide a moving device for a nozzle for a laser device which enables the efficiency of the powder material to be improved and the amount of welding powder which is added to the weld seam or surface layer or the amount of inert gas which is blown in to be reduced to a minimum.

Briefly, the invention provides a laser welding device which comprises a means for directing a laser beam along a first axis onto an operating area of a workpiece and means for moving the laser beam and workpiece relative to each other to effect a relative movement of the beam along a second axis perpendicular to the first axis with the two axes defining a first coordinate system. In addition, the device employs a nozzle for directing a gas with or without a powdery coating material towards the operating area of the workpiece along a third axis and means for controlling the position of the nozzle relative to the operating area during relative movement between the beam and the workpiece.

The simplest way of considering the setting of the nozzle and its movement during a coating process is in a rectangular coordinate system, one axis of which extends along the axis of symmetry of the laser beam and another axis of which points in the direction of movement or travel of the laser beam on the workpiece surface. In this case, a third coordinate axis extends at a right angle to the direction of travel of the laser beam and the origin of the coordinate system lies at the point of incidence of the axis of symmetry of the laser beam on the workpiece surface.

It is irrelevant in this analysis whether it is only the workpiece, only the laser beam or both these which move. Using the device, a nozzle setting is selected for the coating operation which is essentially determined by the following values:

The angle $\beta$ between the axis of symmetry of a jet of powdery material from the nozzle and a plane which is perpendicular to the laser axis;

The angle $\alpha$ between the axis of symmetry of the powder jet from the nozzle and the plane which is defined by the laser beam and the direction of travel of the laser beam;

The point of incidence of the axis of symmetry of the powder jet on the surface of the workpiece;

The distance of the outlet orifice of the nozzle from the surface of the workpiece in the direction of the powder jet.

Of course, the energy of the laser beam in the operating area, the speed of travel of the laser beam on the surface of the workpiece, the strength of the powder jet or powder deliver rate, as well as the material of the workpiece and the composition of the powder are also factors which determine the quality of the resulting layer.

During the coating operation, a molten layer area, which is also called a bath or melting pool, forms on the surface of the workpiece. The angles $\beta$ and $\alpha$ at which the powder jet strikes the bath, from what distance and where, i.e. at which point, are essential factors. The position of the powder jet is advantageously selected such that its axis of symmetry contacts the surface of the workpiece at a point Ep (powder entry point), which is several millimeters, e.g. typically up to approximately ±3 mm, away from the point of intersection EL (laser entry point) of the axis of symmetry of the laser beam with the surface. This distance is essentially determined by the geometry of the bath, which is in turn dependent on, for example, the type of powder which is used, the form and energy of the laser beam, the strength of the powder jet and the layer thickness which is to be produced.

The laser welding device enables the values selected for the angles $\beta$ and $\alpha$, the distance from Ep to EL and the distance of the nozzle orifice from the point Ep to be maintained constant to a large degree, irrespective of the direction of travel of the laser beam on the surfaces of the workpiece. This results in surface layers, particularly relatively large surfaces of uniform quality, whose properties, such as thickness and composition (mixture), are distinctly more uniform.

The selected positions, which remain constant during the coating operation, may, for example, be set by a control means such as an approximately programmed CNC unit, as used with machine tools. CNC units of this kind are able to maintain the selected and set parameters constant by tangential tracking, irrespective of the direction of travel of the laser beam on the workpiece surface.

The nozzle of the laser device may be used for welding or coating workpieces and for blowing gas and/or powdery coating material into the operating area of the laser beam. The powder is melted onto the surface of the workpiece to form layers or serves as a bonding welding flux when parts are welded together.

The means for controlling the position of the nozzle maintains the position of the nozzle largely constant in the coordinate system, even when the relative movements of the laser beam and the workpiece are complex. This enables weld joints and welded-on layers of a complex form and a largely homogenous quality to be produced. It is possible to set and maintain constant the axial and radial positions of the nozzle with respect to the laser beam and its operating area with the bath of molten coating material by means of a controllable manipulator for the nozzle. The nozzle may also have a steplike narrowing portion, which passes from a first cylindrical part into a second, narrower cylindrical part.

The invention will now be illustrated solely on the basis of the examples, in which a layer is to be applied to the surface of the workpiece (deposit welding). It is understood and will be immediately obvious to the person skilled in the art that the device may also be used for inert gas shielded welding, just by blowing the inert gas, e.g. in the form of a rod or powdery welding filler, with the inert gas through the nozzle to the welding point. The invention also enables a metallic or nonmetallic layer to be applied to workpieces of a nonmetallic material, such as a ceramic material, just as it enables a nonmetallic layer, e.g. a ceramic layer, to be applied to a metallic surface.

These and other objects and advantages of the invention will become more apparent from the following detailed description taken in conjunction with the accompanying drawings wherein.

Figure 1:
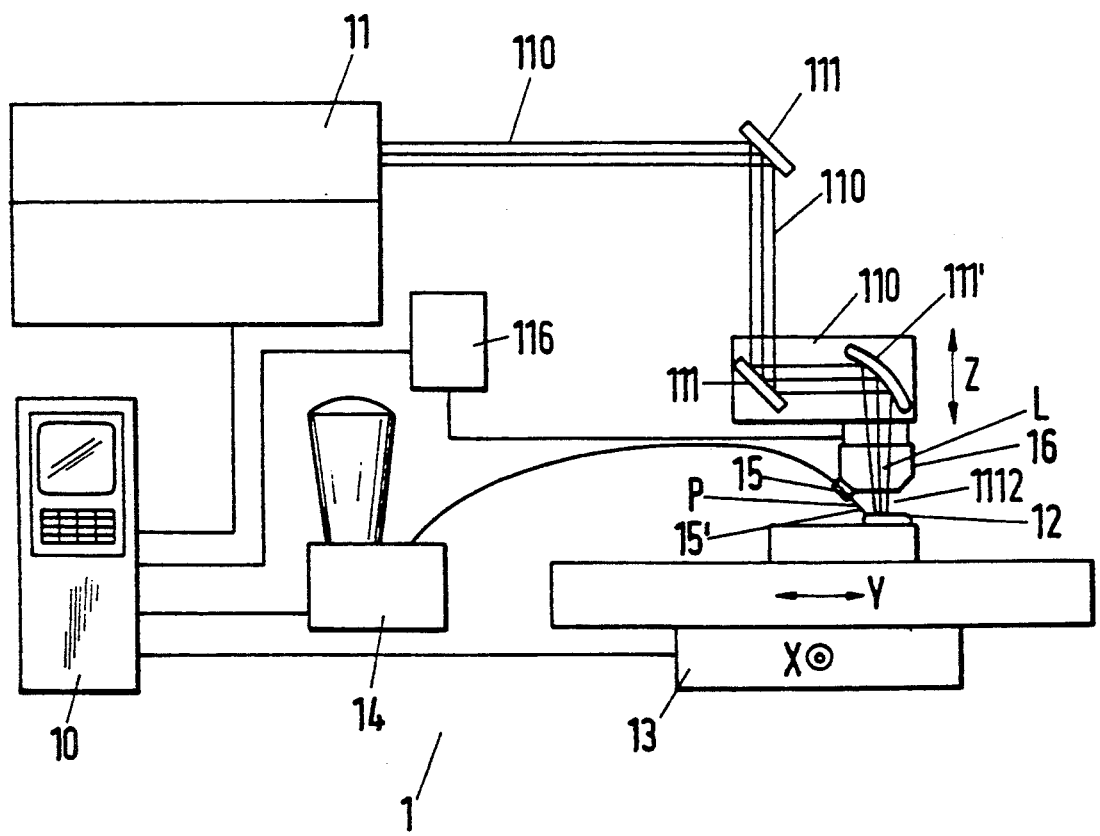
FIG. 1 is a diagrammatic view of a laser device according to the invention for coating workpiece surfaces.

Referring to FIG. 1, the laser welding device 1 is laid out for coating the surface of a workpiece 12. As illustrated, the device 1 has a means 11 for directing a laser beam 110 along an axis L onto an operating area of the workpiece 12. The laser beam 110 may be a $CO_2$ laser and is directed onto the workpiece 12 by an optical system employing a plurality of mirrors, as illustrated. The last mirror 111' of the optical system is formed as a concave mirror, for example, a parabolic mirror, and focuses the laser beam 110 on the operating area 1112 of the workpiece 12.

As indicated, the workpiece 12 is mounted on a table 13 which can be moved in three coordinate directions.

The table 13 serves a means for moving the laser beam 110 and the workpiece 12 relative to each other in order to effect a relative movement of the beam 110 along a second axis F (see FIG. 2) perpendicular to the axis L with the two axes defining a first coordinate system within a plane LF.

A means in the form of a CNC unit 10 is provided to operate and control the means 11 for generating the laser beam 110 as well as for controlling the movements of the table 13.

The welding device 1 also has a nozzle 15 for directing a powdery coating material towards the operating area of the workpiece 12 along a third axis. As illustrated in FIG. 1, a powder conveyor 14, which is controlled by the CNC unit 10, preferably blows metal coating powder with an inert gas, such as helium, argon and nitrogen, through a thermally insulating flexible tube to the nozzle 15 and through this in a powder jet 15' to a bath in the operating area 1112 of the laser beam 110 on the workpiece 12 which is to be coated.

A means is also provided for controlling the position of the nozzle 15 relative to the operating area during relative movement between the laser beam 110 and the workpiece 12. This means is in the form of a manipulator 16 which is controlled by the CNC unit 10 by signals which are transmitted to the manipulator 16 via an interface 116.

Figure 5:
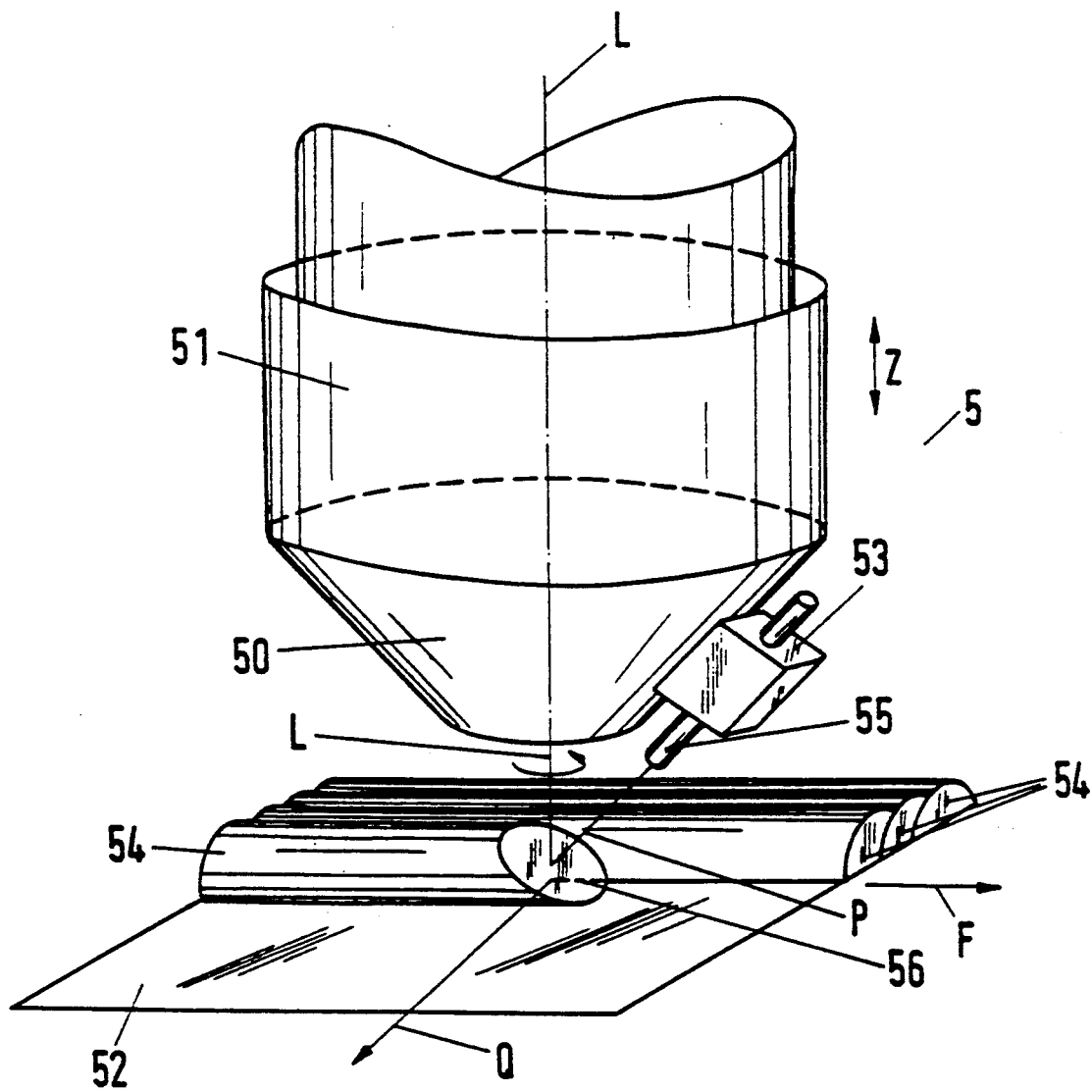
FIG. 5 is a diagrammatic view of an example of a manipulator for the nozzle.

Referring to FIG. 5, the manipulator 16 is in the form of a ring 51 of annular shape with a bore for passage of the laser beam therethrough on a central axis of the ring 51. In addition, the ring 51 has a conical part 50 mounting a housing 53 of the nozzle thereon for directing coating material angularly of the central axis of the ring 51.

Referring to FIG. 1, depending upon the signals from the CNC unit 10 and the interface 116, the manipulator 16 can be moved in the direction indicated by the double arrow z in parallel to the axis L of the laser beam 110 in order to set the nozzle 15 axially of the laser beam axis L. In addition, the manipulator 16 may be rotated such that the ring 51 is rotated in order to set the nozzle 15 in a determined radial angular position relative to the central axis of the ring 51 and thus the axis L of the laser beam.

Figure 2:
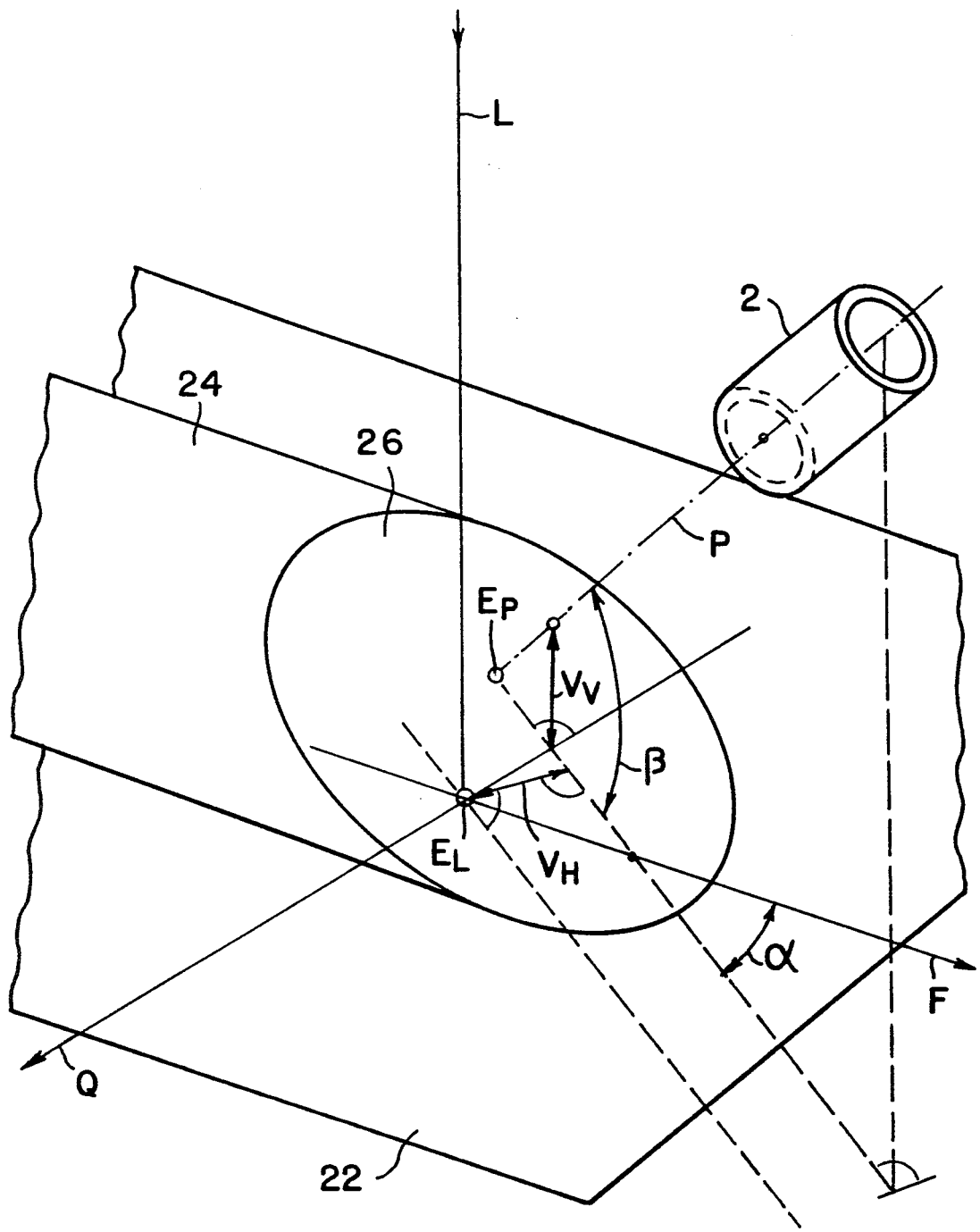
FIG. 2 is a diagrammatic enlarged view of the operating area of the laser beam of the laser device of FIG. 1 on the surface of the workpiece.

Referring to FIG. 2, wherein like reference characters indicate like parts as above, the details relating to the position of the laser beam axis L and the powder jet axis P are shown in relation to one another. As indicated, an axis Q extends from the point of intersection of the two axes L,F in a direction mutually perpendicular to the two axes LF.

As indicated, the axis P of the powder jet is skewed relative to the laser beam axis L and the axis F of movement. To this end, the axis P of the powder jet contacts the LQ plane above the FQ plane at a point displaced upwards by several millimeters from the surface of the workpiece 22 (vertical displacement Vv). The powder jet P is, at the same time, displaced by the distance VH from the laser axis (horizontal displacement VH). As a result, the powder jet P is directed directly onto the central part of the bath 26 of the layer 24, the welding bead. The angles which the powder jet P forms with the FQ and FL planes are designated by $\beta$ and $\alpha$, respectively. The CNC unit is programmed such that, for example, the positions of the powder jet P, the laser beam L and the workpiece 12 in relation to one another are always at least approximately maintained. The distance between the orifice of the nozzle 15 and the surface of the bath 26 is typically between 3 and 40 millimeters (mm), considered in the direction of the jet.

Related to the FQ plane, the vertical displacement Vv may be between approximately $-1$ and $+9$ millimeters (mm), according to the angle $\beta$. Related to the plane which extends through the origin, the horizontal displacement VH is typically between approximately $-3$ and $+3$ millimeters (mm). The layer thicknesses which are applied to the surface of the workpiece are usually between fractions of a millimeter and a few millimeters, e.g. between 0.1 and 5 millimeters (mm).

Figure 3:
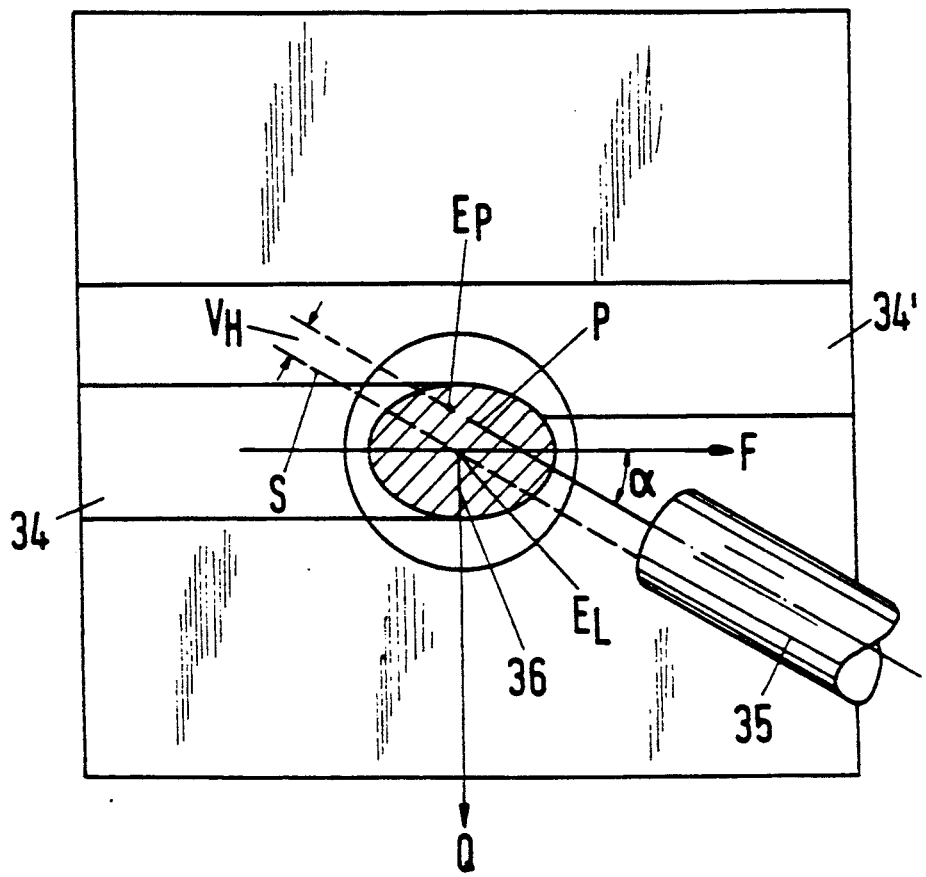
FIG. 3 is a diagrammatic plan view onto the operating area of a laser device according to the invention.

FIG. 3 shows the powder nozzle 15 and the axis P of the powder jet which is displaced by the horizontal displacement VH with respect to the laser axis L. As a result, the powder jet P strikes the molten bath 26 of the surface layer or bead 24 centrally, thus helping to improve the quality of the coating. The layer 24 is applied to the surface of the workpiece 12 in an overlapping manner parallel to an adjacent bead or layer 24'.

Figure 4:
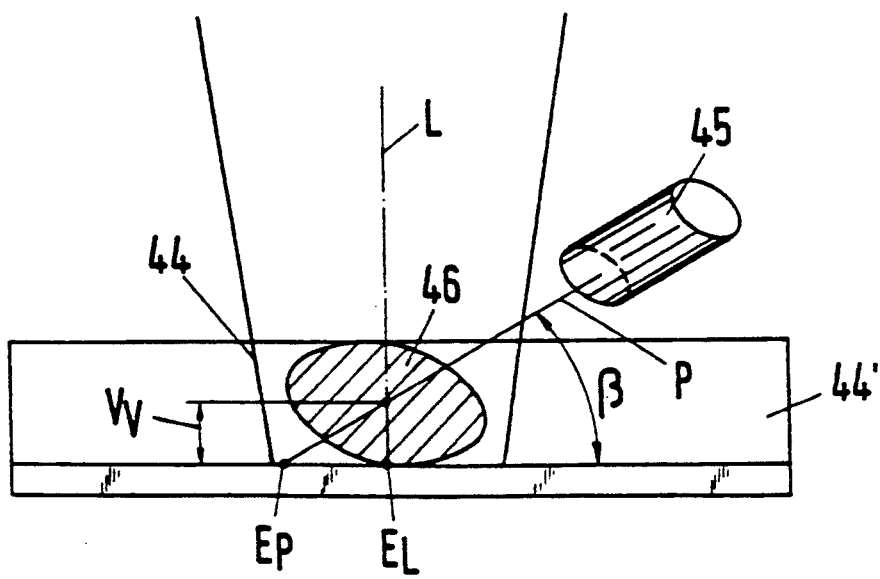
FIG. 4 is a diagrammatic side view of the operating area of the laser device FIG. 3.

The vertical displacement VV of the powder jet P from the nozzle 15 is clearly shown in the side view of FIG. 4. the powder jet P from the nozzle 15 strikes the molten bath 26 of the surface layer centrally in the operating area of the laser beam L. The efficiency with which the powder in the powder jet P is melted to form the bead or surface layer 24 is then improved, resulting in an improved material yield.

As indicated in FIG. 2, the laser beam axis L and the axis F intersect at a point of incidence of the laser beam on the surface of the workpiece 12, i.e. at point $E_L$ while the axis P of the powder jet is in a plane spaced from the point of intersection, said plane being indicated by the dashed lines. As indicated, the axis P of the powder jet is skewed relative to the laser beam axis L and intersects the plane LQ at a point EP above the surface of the workpiece 12 and at a point within the operating area 26 of the feed 24. As indicated above, the axis P of the powder jet is angularly disposed relative to the plane FQ of the axis F (see FIG. 4) and may intersect this plane FQ at a point preceding the point of incidence $E_L$ of the laser beam axis L or may follow this point of incidence.

Further, the angular disposition of the nozzle 15 may be at an angle of between 30° and 70° relative to the plane FQ of the axis F.

Referring to FIG. 5, during operation, the powder jet is directed along the axis P onto the bath 26. The rotary and axial movements of the outer ring 51 may be produced by stepping motors or d.c. motors, for example. Here, the layers 24 are applied to the surface of the workpiece 12 in an overlapping manner. The maximum axial displacement Z is advantageously approximately 50 millimeters (mm). The angle of rotation of the outer ring 51 of the manipulator may be more than 360°.

Figure 6:
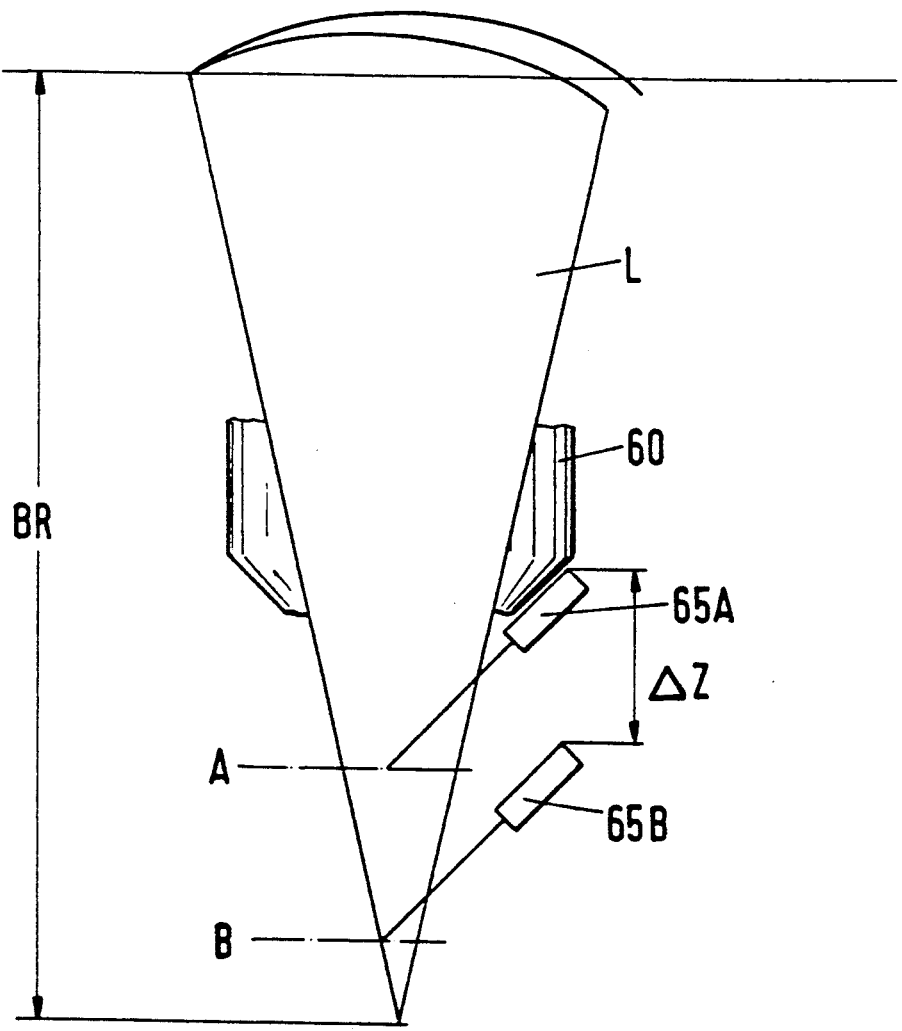
FIG. 6 shows diagrammatically two different axis positions of the nozzle with respect to a converging laser beam.

FIG. 6 shows a converging laser beam L with a focal length BR and two different axial positions A and B of the operating area on the workpiece and the corresponding positions 15A and 15B of the nozzle 15. The outer ring 50 is only indicated in the position A in this figure.

Figure 7:
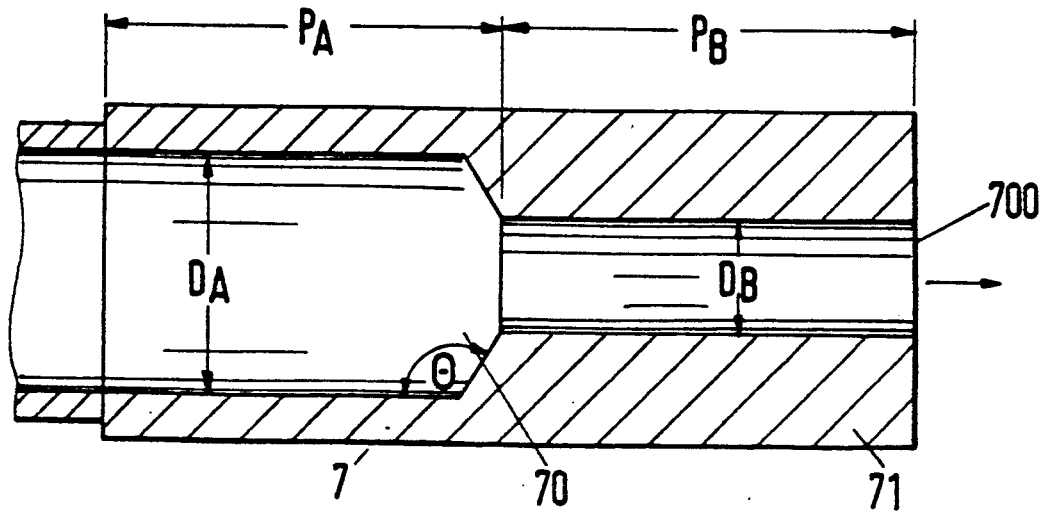
FIG. 7 is a diagrammatic cross section through a nozzle with a cross-sectional step.

Referring to FIG. 7, the nozzle may be formed with a body 71 having two portions $P_A$, $P_B$ with the upstream portion $P_A$ having a cylindrical bore of diameter $D_A$ of larger size than a bore $D_B$ in the downstream portion $P_B$. In addition, a step-like narrowing portion 70 is disposed between the two bores through which the powdery material is conveyed in the direction indicated by the arrow through an orifice 700 of the nozzle body 71. This nozzle portion 70 advantageously narrows at an angle $\theta$ of between 90° and 150°. The diameter $D_A$ may be between 1 and 5 millimeters (mm). According to the diameter $D_A$, the smaller diameter $D_B$ is between approximately 0.5 and 2.5 millimeters (mm). The lengths $P_A$ and $P_B$ are advantageously between 15 and 90 millimeters (mm) and 15 and 120 millimeters (mm) respectively. A metal, e.g. copper, or a ceramic material are suitable for the nozzle body 71. The jet from the nozzle, i.e. the powder jet or the inert gas jet, is more or less focussed, according to the geometry of the nozzle 15 and the way in which the cross-sectional step portion 70 narrows. It is also possible to arrange the two nozzle bores asymmetrically in the nozzle body 71.

Figure 8:
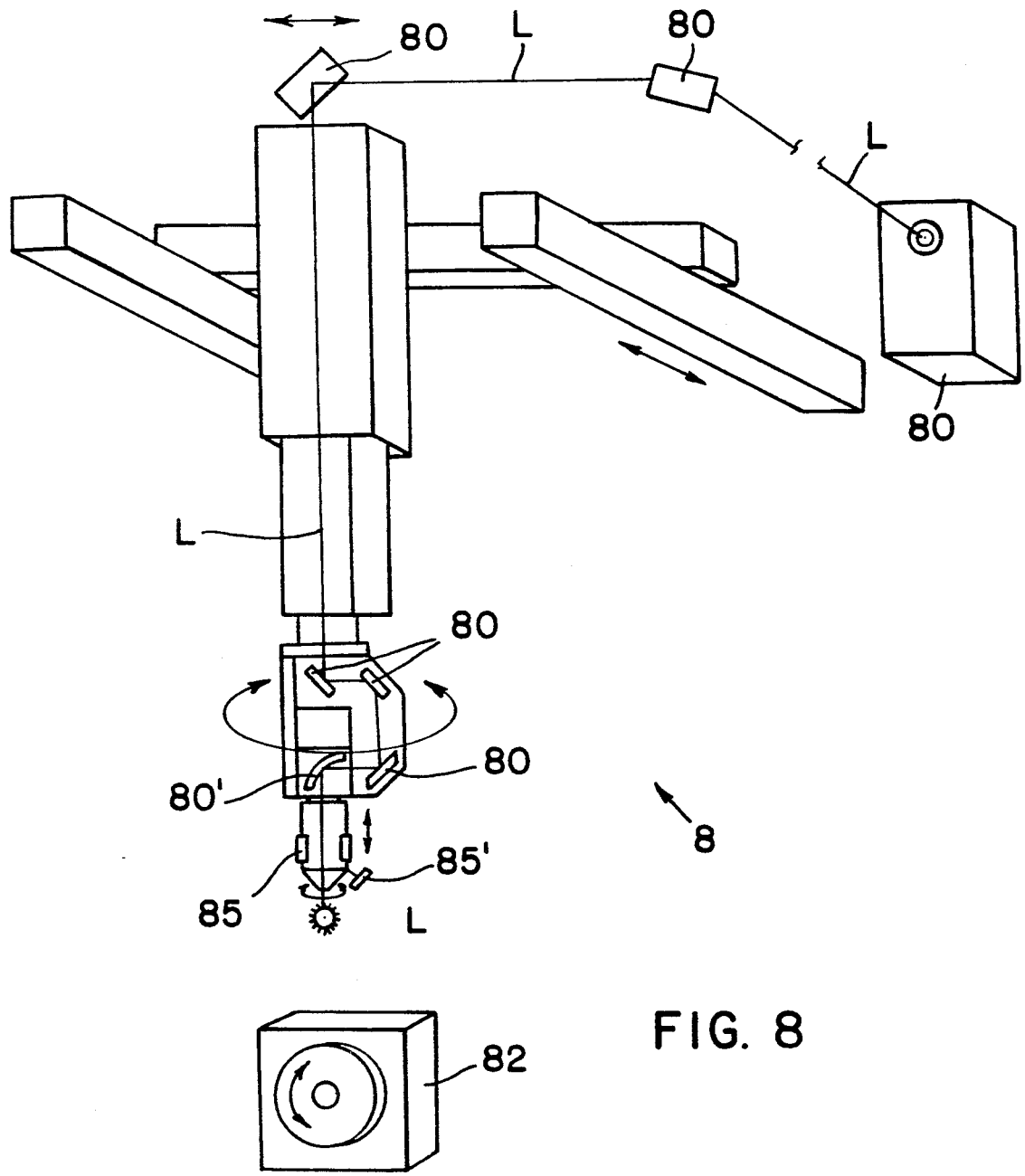
FIG. 8 is a diagrammatic view of a portal robot with a so-called flying optical system and a simple manipulator for the workpiece.

FIG. 8 shows a laser device 8 with a flying optical system, i.e. the laser beam direction can be adjusted in space within broad limits. The beam L of the laser is deflected by mirrors 80 and finally focussed by a concave mirror 80'. The manipulator 85 for the nozzle 85' enables the latter to be displaced in the axial direction and rotated about the laser beam L. The illustrated device also comprises an turning table 82 for turning a workpiece which is to be treated in the operating area of the laser beam L. The possible ways of moving the laser system and the manipulator are indicated by arrows.

What is claimed is:

1. A laser welding device comprising
means for direction a laser beam along a first axis onto an operating area of a workpiece;
means for moving said laser beam and said workpiece relative to each other to effect a relative movement of said beam along a second axis, said first axis and said second axis intersecting at a point of incidence of said laser beam on a surface of said workpiece;

a nozzle for directing a gas with or without a powdery coating material towards said operating area of said workpiece along a third axis disposed in a plane spaced from said point of incidence; and means for controlling the position of said nozzle relative to said operating area during relative movement between said beam and said workpiece.

2. A laser welding device comprising means for directing a laser beam along a first axis onto an operating area of a workpiece;

a table mounting said workpiece thereon and being movable in three coordinate directions for moving said laser beam and said workpiece relative to each other to effect a relative movement of said beam along a second axis;

a nozzle for directing a gas with or without a powdery coating material towards said operating area of said workpiece along a third axis; and means for controlling the position of said nozzle relative to said operating are during relative movement between said beam and said workpiece.

3. A laser welding device as set forth in claim 1 wherein said third axis is angularly disposed relative to said second axis.

4. A laser welding device as set forth in claim 3 wherein said third axis intersects said second axis at a point preceding said point of incidence.

5. A laser welding device as set forth in claim 3 wherein said third axis intersects said second axis at a point following said point of incidence.

6. A laser welding device comprising means or directing a laser beam along a first axis onto an operating area of a workpiece;

means for moving said laser beam and said workpiece relative to each other to effect a relative movement of said beam along a second axis;

a nozzle for directing a gas with or without a powdery coating material towards said operating area of said workpiece along a third axis intersecting a first plane perpendicular to a second plane containing said first and second axes on an angle of between 30° and 70° relative to said second axis; and means or controlling the position of said nozzle relative to said operating area during relative movement between said beam and said workpiece.

7. A laser welding device as set forth in claim 1 wherein said means for controlling the position of said nozzle includes means for rotating said nozzle about said first axis to vary the angle between said third axis and said second axis.

8. A laser welding device as set forth in claim 7 wherein said means for rotating said nozzle allows rotation of said nozzle over an angle of at least 360° about said first axis.

9. A laser welding device comprising means for directing a laser beam along a first axis onto an operating area of a workpiece;

means for moving said laser beam and said workpiece relative to each other to effect a relative movement of said beam along a second axis;

a nozzle for directing a gas with or without a powdery coating material towards said operating area of said workpiece along a third axis, said third axis being skewed relative to said second axis, said third axis being disposed at a first angle relative to a plane perpendicular to said first axis and containing said second axis and being disposed at a second angle relative to a plane containing said first and second axes; and means for controlling the position of said nozzle relative to said operating area during relative movement between said beam and said workpiece.

10. A laser welding device as set forth in claim 9 which further comprises a control means for maintaining said first angle, said second angle and the distance of said nozzle from said operating area constant during relative movement of said beam and said workpiece.

11. A laser welding device as set forth in claim 6 wherein said means for controlling the position of said nozzle includes means for rotating said nozzle abut said first axis to vary the angle between said third axis and said second axis.

12. A laser welding device as set forth in claim 11 wherein said means for rotating said nozzle allows rotation of said nozzle over an angle of at least 360° about said first axis.

13. A laser welding device comprising means for directing a laser beam along a first axis onto an operating area of a workpiece;

means for moving said laser beam and said workpiece relative to each other to effect a relative movement of said beam along a second axis;

a nozzle for directing a gas with or without a powdery coating material towards said operating area of said workpiece along a third axis, said nozzle having a first cylindrical bore of predetermined diameter for conveying a gas with or without coating material therethrough, a second cylindrical bore of a diameter less than said first bore for receiving and conveying a gas with or without coating material therefrom, and a step-like narrowing portion between said bores; and means for controlling the position of said nozzle relative to said operating area during relative movement between said beam and said workpiece.

14. A manipulator for a laser welding device comprising a ring of annular shape with a bore for passing of a laser beam therethrough on a central axis of said ring, said ring having a conical part for mounting of a nozzle thereon for directing gas with or without coating material angularly of said central axis;

means for controlling and moving said ring parallel to said first axis to set the nozzle axially of said central axis; and means for rotating said ring about said axis to set the nozzle in a determined radial angular position relative to said central axis.

15. A laser welding device comprising means for directing a laser beam along a first axis perpendicular to an operating area of a workpiece;

means for moving said laser beam and said workpiece relative to each other to effect a relative movement of said beam along a second axis perpendicular to said first axis with said axis defining a first coordinate system;

a nozzle for directing a gas with or without powdery coating material towards said operating area of said workpiece along a third axis, said third axis being skewed relative to said second axis, said third axis being disposed at a first angle relative to a plane perpendicular to said first axis and containing said second axis and being disposed at a second angle relative to a plane containing said first and second axes.

16. A laser welding device as set forth in claim 15 wherein said first angle is between 30° and 70°.

17. A laser welding device as set forth in claim 15 wherein said third axis intersects said plane containing said first and second axes at a point spaced above said operating area of the workpiece.

18. A laser welding device as set forth in claim 15 which further comprises a ring rotatably mounted on said first axis with said nozzle mounted thereon for rotation about said central axis.

19. A laser welding device as set forth in claim 18 wherein said ring has a conical portion having said nozzle mounted thereon.

20. A laser welding device as set forth in claim 18 which further comprises control means for moving said ring coaxially of said first axis.

21. A laser welding device as set forth in claim 13 wherein said bores are asymmetrically disposed relative to a body of said nozzle containing said bores.

* * * * *

UNITED STATES PATENT AND TRADEMARK OFFICE
CERTIFICATE OF CORRECTION

PATENT NO. : 5,147,999
DATED : September 15, 1992
INVENTOR(S) : Dekumbis et al.

It is certified that error appears in the above-identified patent and that said Letters Patent is hereby corrected as shown below:

```
Column 2, line 62, change "deliver" to --delivery--;

Column 4, line 35, change "a" to --as a--;

Column 5, line 56, change "4.  the" to --4.  The--;

Column 6, line 1, change "EP" to --Ep--;

Column 6, line 57, change "an" to --a--;

Column 6, line 63, change "direction" to --directing--;

Column 7, line 22, change "are" to --area--;

Column 7, line 34, change "or" to --for--;

Column 8, line 14, change "abut" to --about--.
```

Signed and Sealed this

Eighteenth Day of October, 1994

*Attest:*

BRUCE LEHMAN

*Attesting Officer*  *Commissioner of Patents and Trademarks*